June 7, 1927.
J. BAMFORD ET AL
1,631,455
TINE FOR HAYMAKING AND LIKE MACHINERY
Filed Sept. 10, 1925
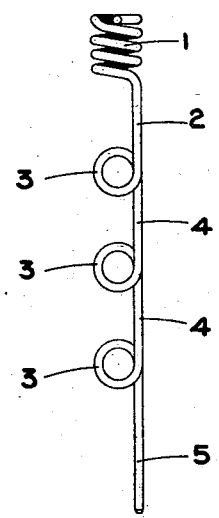
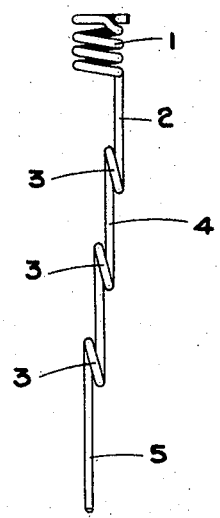
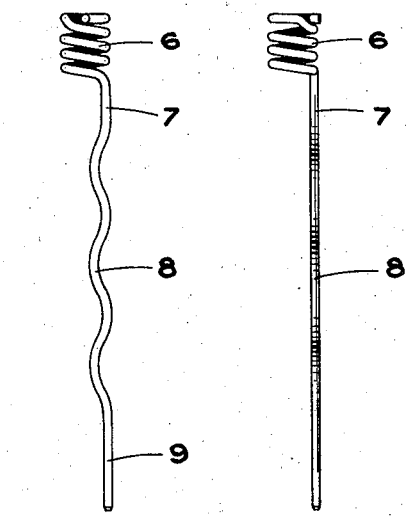
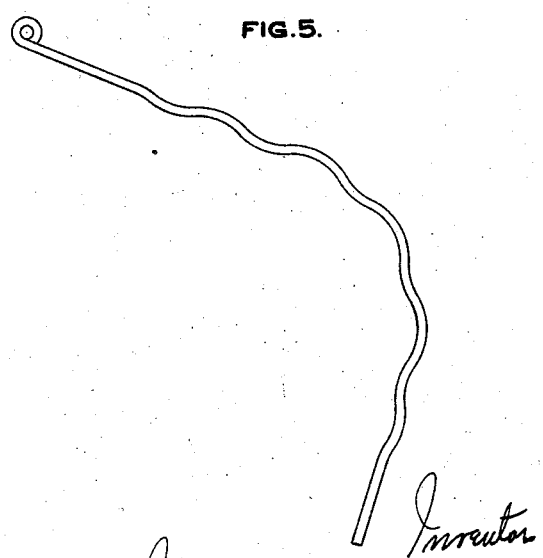

Patented June 7, 1927.

1,631,455

UNITED STATES PATENT OFFICE.

JOSEPH BAMFORD AND CYRIL JOSEPH BAMFORD, OF UTTOXETER, ENGLAND.

TINE FOR HAYMAKING AND LIKE MACHINERY.

Application filed September 10, 1925, Serial No. 55,566, and in Great Britain October 7, 1924.

This invention relates to tines for haymaking and like machinery, such, for instance, as swath turners and side delivery rakes, of the kind wherein the tines are controlled by rotary mechanism which keeps the ends of the tines always directed towards the ground.

In connection with tines in the class of machine to which this invention relates, we and others have already used tines, the free or point ends of which have been curved forwardly in the direction of their motion and also tines having their anchored ends formed into coils.

The primary object of the present invention is to provide a tine which will be more efficient in use inasmuch as it will take hold of the crop more effectually so that the crop will be moved or conveyed by the tines with less liability of the tines slipping through the crop and less liability of the crop rising up the tines.

According to the present invention that part of the tine which is intermediate its anchored and free ends is formed into or provided with a plurality of curves, loops or irregular formations.

The shank of the tine may thus be made of a sinuous or undulating or corrugated form. The undulations, curves or corrugations may be regular or irregular and they may all be disposed more or less transversely or in any other position relative to the direction of motion of the tine through the crop, or they may be disposed at various angles to the plane of movement of the tine.

Instead of forming the undulations or irregular formations by bending the material of which the tine is made, either a straight, corrugated or irregular tine may be provided with additional pieces or members secured thereto for the purpose of taking hold of the crop more effectually.

Referring to the drawings:—

Figure 1 is a front view showing one form of tine constructed in accordance with our invention.

Figure 2 is a side view thereof.

Figure 3 is a front view of another form of tine constructed in accordance with our invention.

Figure 4 is a side view thereof.

Figure 5 is a view in side elevation showing another form of tine suitable for mounting upon a rotating disc or reel.

In the construction shown in Figures 1 and 2, the upper end of the tine which is to be anchored is to be formed as an open coil 1, while the shank 2 of the tine is formed with a number of lateral loops 3 with intervening straight portions 4, the lowest loop 3 terminating in a point portion 5.

In the construction shown in Figures 3 and 4, the upper portion of the tine is formed as an open coil 6 from which extends the shank portion 7, the major part 8 of which is of wavy or sinuous form, the waves or curves being arranged laterally and disposed all in the same plane. The tine terminates in a straight point portion 9.

Our invention is applicable to double tines having a plurality of shanks such as those in which a length of material is bent to U shape and anchored at the bend so as to constitute a pair of tines. Further, our invention is applicable to tines having either straight or curved points or free ends and is applicable to tines anchored in any manner to the carrying part.

In the construction shown in Figure 5 a tine, the shank portion of which is corrugated, is shown, the said tine being of a type suitable for application to a rotating head or reel. The corrugations or irregularities may either be all in one plane or they may be in various planes.

It will be understood that in any of the tines herein described, the corrugations or irregularities or the additional pieces or members fastened to the tines may either be disposed transversely to the direction of movement of the tine through the crop, or they may be disposed at any other angle in relation to the direction of movement.

What we claim then is:—

1. A tine for the rotary tine carrying members of haymaking and harvesting machines comprising a head formed as an open coil for receiving a securing bolt, and a shank for engaging in the crop, said shank having, intermediate its ends, a plurality of projecting portions for the purpose of taking hold of the crop more effectually.

2. A tine for the rotary tine carrying members of haymaking and harvesting machines comprising a head formed as an open coil for receiving a securing bolt, and a shank for engaging in the crop, having, intermediate its ends, a portion which is bent into curves which form projections.

3. A tine for the rotary tine carrying members of haymaking and harvesting machines comprising a head formed as an open coil for receiving a securing bolt, and a shank for engaging in the crop, said shank having, intermediate its ends, a portion which is bent into loops which form projections for the purpose specified.

4. A tine for the rotary tine carrying members of haymaking and harvesting machines comprising a head formed as an open coil for receiving a securing bolt, and a shank for engaging in the crop, said shank having, intermediate its ends, a portion provided with a number of projecting shoulders for the purpose specified.

5. A tine for the rotary tine carrying members of haymaking and harvesting machines comprising a single length of wire having one end bent to form an open coiled spring and having its remaining part arranged to form a shank for engaging with the crop, the said shank being bent at intervals to form projections to assist in taking hold of the crop more effectually.

In witness whereof we affix our signatures.

JOSEPH BAMFORD.
CYRIL JOSEPH BAMFORD.